United States Patent Office 2,767,504
Patented Oct. 23, 1956

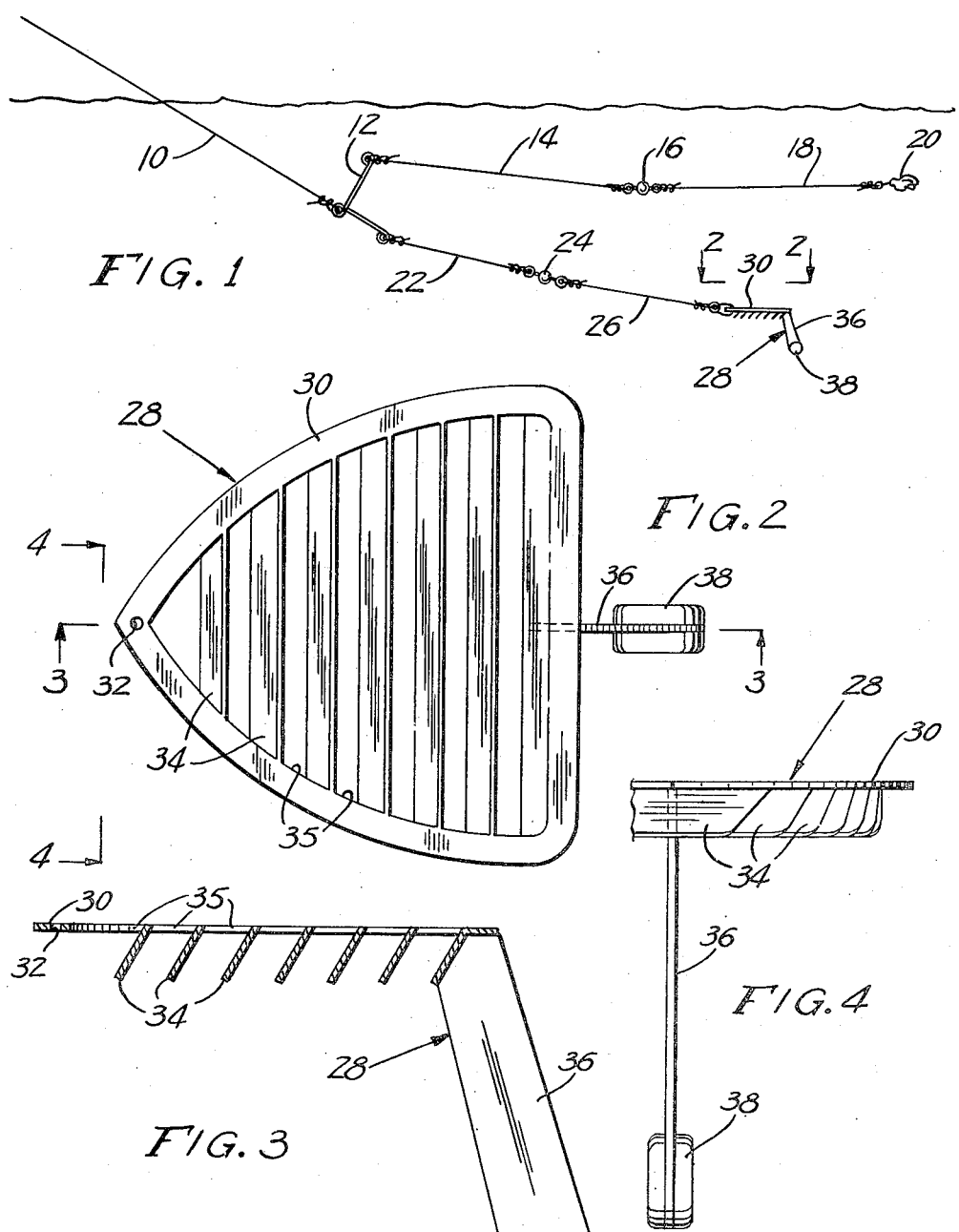

2,767,504

DEPTH CONTROL AND RUDDER DEVICE FOR TROLLING

Glenn F. Atkinson, Perrysville, Ohio

Application November 10, 1955, Serial No. 546,042

5 Claims. (Cl. 43—43.13)

This invention relates to fishing equipment, and more particularly has reference to a device adapted to be used in trolling, to provide a stabilized rudder means and, at the same time, a means for holding the bait at a selected depth within the water.

The conventional practice in trolling, for holding the weight at a desired depth, is to use heavy lead weights. Such weights have certain undesirable characteristics, and one of these is the tendency of the weight to deaden or dampen the force with which a fish pulls upon the line when endeavoring to escape after being hooked. As a result, the fish seemingly has less fight, and this of course detracts from the full pleasure afforded during fishing.

Further, a notable deficiency in the weights resides in the necessity of continually reducing or adding thereto, to hold the bait at a selected depth. Further, the weights fail to hold the bait in a straight line, causing crossing of lines and further causing the lines to deviate from the path followed by the boat when a turn is being made.

It has heretofore been proposed to provide rudders for use in trolling, to hold the lines straight and in a stabilized condition, and it has also been proposed to provide a rudder construction which will afford depth control. The invention, in this connection, is directed to an improvement in the type of device in which rudder or stabilizer means is combined wth a depth control means, thus to, in a single article, reduce or eliminate completely the lead weights that will be used for holding the bait at a selected depth, and wholly stabilize the line so that it extends straight rearwardly from the boat and follows the path of the boat accurately.

A more specific object of the invention is to provide an improved depth control and ruddering device for trolling, wherein the device would include a flat frame which will extend in a generally horizontal plane at a desired depth, with said frame having louvers so pitched as to cause the frame to continually seek said depth, to in turn hold the bait at the desired depth below the surface of the water.

Another object is to so form said frame that any tendency thereof to deviate from a straight path responsive, for example, to lateral forces exerted thereagainst by water currents, or by currents resulting from turning of the boat, will automatically cause the frame to swing back into position by reason of a depending stabilizing member or keel carried thereby.

Other objects will appear from the following description the claims appended thereto, and from the annexed drawing, in which like reference characters designate like parts throughout the several views, and wherein:

Figure 1 is a view showing a trolling device formed according to the present invention, as it appears when in use;

Figure 2 is an enlarged top plan view of the trolling device per se;

Figure 3 is a longitudinal sectional view through said device substantially on line 3—3 of Figure 2; and Figure 4 is a fragmentary front elevational view of the trolling device, as seen from the line 4—4 of Figure 2.

The device constituting the present invention is illustrated in Figure 1 in proper relationship to other pieces of fishing equipment, including a line 10 extending from the fishing rod, not shown, a V-shaped connector 12, connected intermediate its ends to line 10; a leader 14 extending from one end of the connector to a swivel 16, a leader 18 connected between the swivel and a bait 20, a leader 22 connected between the lower end of the connector 12 and a swivel 24, and a leader 26 extending from the swivel 24.

The trolling device constituting the present invention is connected at its leading end to the leader 26, and has been generally designated at 28. The device includes a frame 30 which is substantially of isosceles triangular shape in outer configuration, the sides, however, of the frame being preferably curving bulged outwardly as shown in Figure 2. The frame can be formed from a comparatively light, thin sheet metal blank, of any desired metal material such as aluminum, or alternatively could be made of plastic material, or the like. In any event, at its leading or apex end, the frame 30 has an aperture 32 receiving the leader 26.

Integrally formed upon the frame, and extending between the opposite sides thereof at locations uniformly spaced longitudinally of the frame, are louvers 34, the lengths of which are normal to the longitudinal center line of the frame. The louvers are projected downwardly from the plane of the frame, as shown in Figure 3, and are pitched obliquely to said plane, with the lower or free longitudinal edges of the louvers being disposed forwardly of their respective upper edges and the upper edges terminating in the plane of the frame.

The louvers are preferably of identical width as shown in Figure 3, so that their lower edges all lie in a common plane paralleling that of the frame.

It will be seen that to form the frame and associated louvers, a single blank of sheet metal material can be provided, with the louvers struck out of the material of said blanks. This in turn defines slots 35 between the several louvers, through which water deflected upwardly by the louvers may pass.

Due to the triangular formation of the frame, the leading louver is shorter in length than the next following louver, and this arrangement is carried out substantially to the trailing end of the frame, the two trailing louvers being, however, substantially coextensive in length. Due to this arrangement, water impinging against the front surface of the leading louver will be deflected upwardly through the slot 35 thereabove, and at the same time will exert a force against the louver tending to bias the same downwardly. Meanwhile, water will impinge against the louver 34 next in back of the leading louver, particularly at the ends of said second louver, since the second louver is longer than the first. This is all shown to particular advantage in Figure 4, wherein it is clearly seen that the several louvers are disposed in a stepped arrangement, each louver having its ends projecting outwardly beyond the ends of the louver next preceding the same.

Due to this arrangement, the frame is forced downwardly within the water, while still being kept in a horizontal plane due to the fact that water impinges against the louver fully from end to end of the frame. The frame, when forced downwardly discharges the function of a weight, and accordingly, the trolling device constituting the present invention can be much lighter than would be the weights ordinarily required to bring the lure or bait 20 to an equivalent depth.

Secured to the trailing end of the frame, medially between the opposite sides thereof, is the upper end of a stabilizing fin 36, said fin being disposed in a plane normal to that of the frame and being inclined slightly from the vertical, in a direction outwardly from the frame. The fin at its lower end is secured to small weight elements 38 disposed at opposite sides of the fin. Again, it should be noted that the weight elements need by no means be of a weight equivalent to those normally used for bringing the lure to a selected depth, said weight elements being only for the purpose of stabilizing the device against transverse rocking movement as it is drawn through the water.

In use, the depth control and ruddering device, when drawn through the water, will seek a particular depth and accordingly will control the depth of the lure 20. Further, the device rides in a highly stabilized manner through the water, tending to follow the boat in a straight path and tending to be restrained against bearing outwardly when the boat makes a turn.

It may be noted that the construction is such that the louvers 34 can be bent if desired, to different angles in relation to the plane of the frame, when the device is made of such material as thin sheet metal, thus to change the depth at which the device will ride when drawn behind the boat.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A depth control and ruddering device for trolling comprising a planiform frame; keel means depending from the frame in a plane normal to that of the frame, thus to maintain the frame in a substantially horizontal plane when being drawn through the water; and louvers extending transversely of the frame and pitched obliquely to the plane of the frame in a direction such that water impinging against the louver will force the same downwardly, to bring the frame to a selected depth in the water.

2. A depth control and ruddering device for trolling comprising an approximately triangular frame adapted at its leading, apex end for connection to a fishing line; louvers struck downwardly out of the material of the frame, to define slots between the louvers through which water impinging against the louvers may pass, said louvers being pitched obliquely to the plane of the frame in a direction such that the frame will be forced downwardly within the water when pulled by said line; and keel means depending from the frame adapted to stabilize the same against lateral deviation.

3. A depth control and ruddering device for trolling comprising a single piece of sheet material having an outer configuration generally approximating that of an isosceles triangle, said piece at the apex end of the triangle being adapted for connection to a fishing line; a plurality of louvers spaced longitudinally of said piece and extending transversely between opposite sides of the piece, said louvers being struck out of the material of the piece and defining between adjacent louvers transverse slots in the piece through which water may pass following impingement of the same against the louvers, said louvers being pitched obliquely to a vertical plane in a direction such as to cause the louvers to be forced downwardly responsive to said impingement of water thereagainst, to correspondingly force downwardly the piece of material and the line connected thereto; and keel means depending from the trailing end of said piece of material adapted to stabilize the same against lateral deviation and rocking during movement of the piece through the water.

4. A depth control and ruddering device for trolling comprising a single piece of sheet material having an outer configuration generally approximating that of an isosceles triangle, said piece at the apex end of the triangle being adapted for connection to a fishing line; a plurality of louvers spaced longitudinally of said piece and extending transversely between opposite sides of the piece, said louvers being struck out of the material of the piece and defining between adjacent louvers transverse slots in the piece through which water may pass following impingement of the same against the louvers, said louvers being pitched obliquely to a vertical plane in a direction such as to cause the louvers to be forced downwardly responsive to said impingement of water thereagainst, to correspondingly force downwardly the piece of material and the line connected thereto; and keel means depending from the trailing end of said piece of material adapted to stabilize the same against lateral deviation and rocking during movement of the piece through the water, comprising a fin extending in a plane normal to that of said piece, said fin having its lower end projecting rearwardly beyond the trailing end of said piece, and weight elements secured to the lower end of the fin at opposite sides thereof.

5. A depth control and ruddering device for trolling comprising an open center frame in the general shape of an isosceles triangle adapted at its apex end for connection to a fishing line, said frame being of planiform formation; a plurality of louvers spaced uniformly apart longitudinally of the frame, said louvers extending normally to the longitudinal center line of the frame and, by reason of the triangular shape of the frame, being progressively increased in length in a direction away from the apex end of the frame, whereby the ends of one louver will project beyond the ends of the louver next preceding the same, said louvers having their upper edges in the plane of the frame and their lower edges in a common plane paralleling that of the frame, the louvers being pitched obliquely to the plane of the frame in a direction such that water impinging against the louvers will force the same downwardly to carry the frame to a selected depth within the water, with the water passing upwardly through the open center of the frame following impingement against the louvers; and stabilizing means depending from the trailing end of the frame, comprising a fin lying in a plane normal to that of the frame and weight elements on the lower end of the fin.

No references cited.